(12) United States Patent
Sato et al.

(10) Patent No.: US 8,525,062 B2
(45) Date of Patent: Sep. 3, 2013

(54) WIRE GUIDE HOUSING FOR WIRE ELECTRICAL DISCHARGE MACHINING DEVICE

(75) Inventors: Akira Sato, Fukui (JP); Yoshiaki Arikawa, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 231 days.

(21) Appl. No.: 13/063,694

(22) PCT Filed: Sep. 16, 2009

(86) PCT No.: PCT/JP2009/004661
§ 371 (c)(1),
(2), (4) Date: Apr. 18, 2011

(87) PCT Pub. No.: WO2010/032460
PCT Pub. Date: Mar. 25, 2010

(65) Prior Publication Data
US 2011/0233172 A1    Sep. 29, 2011

(30) Foreign Application Priority Data

Sep. 16, 2008    (JP) ................................ 2008-235889

(51) Int. Cl.
*B23H 7/10*    (2006.01)
(52) U.S. Cl.
USPC ....................................................... 219/69.12

(58) Field of Classification Search
USPC ....................................................... 219/69.12
See application file for complete search history.

(56) References Cited

U.S. PATENT DOCUMENTS

| | | | | |
|---|---|---|---|---|
| 4,618,761 A | * | 10/1986 | Inoue et al. | 219/69.15 |
| 4,698,476 A | * | 10/1987 | Yamamoto et al. | 219/69.12 |
| 5,288,966 A | * | 2/1994 | Kawanabe et al. | 219/69.12 |

FOREIGN PATENT DOCUMENTS

| | | | |
|---|---|---|---|
| JP | S55-157430 | | 12/1980 |
| JP | S59-156623 | | 9/1984 |
| JP | 63-120025 | | 5/1988 |
| JP | 63-283820 | | 11/1988 |
| JP | 2006-224259 | | 8/2006 |
| JP | 2008-036809 A | * | 2/2008 |

* cited by examiner

*Primary Examiner* — Geoffrey S Evans
(74) *Attorney, Agent, or Firm* — J.C. Patents

(57) ABSTRACT

A wire guide housing (1) which contains a wire guide (6) for supporting a running wire electrode (W) and in which a wire running passage (32, 23b, 41, 26, 63, 66a) through which the wire electrode passes is formed. The wire guide housing includes: a cleaning liquid supply opening (43), for introducing a cleaning liquid (C) into the wire guide housing; a cleaning liquid discharge opening (44), for discharging the cleaning liquid from the wire guide housing; a first flow passage (46), for connecting the cleaning liquid supply opening to the wire running passage; and a second flow passage (48), for connecting the wire running passage to the cleaning liquid discharge opening. The cleaning liquid flows into the wire running passage at a side more upstream than the wire guide.

3 Claims, 7 Drawing Sheets

WIRE GUIDE HOUSING FOR WIRE ELECTRICAL DISCHARGE MACHINING DEVICE

CROSS-REFERENCE TO RELATED APPLICATION

This application claims the priority benefit of Japan application serial no. 2008-235889, filed on Sep. 16, 2008. The entirety of the above-mentioned patent application is hereby incorporated by reference herein and made a part of this specification.

BACKGROUND OF THE INVENTION

1. Field of the Invention

The disclosure relates to a wire electrical discharge machining device, which machines a work by generating electric discharge across a machining gap formed between a wire electrode running between a pair of wire guides and the conductive work. In particular, the disclosure relates to a wire guide housing for receiving a wire guide.

2. Description of Related Art

A typical wire electrode is made of brass and has a diameter of 0.20 mm. A wire guide includes a guide hole through which the wire electrode passes. Generally, a diameter of the guide hole is 0.01 mm greater than that of the wire electrode. The wire guide is consumed due to a running wire electrode and thus needs to be replaced. Usually, the wire guide is replaceably received in a wire guide housing. Additionally, a conductor in contact with the wire electrode and transporting current thereto is also received in the wire guide housing. A typical conductor is made of cemented carbide.

Patent document 1 has disclosed a wire guide housing receiving a guide unit retaining a wire guide. A mounting hole complementary to a shape of the guide unit is formed in the wire guide housing. When the guide unit is embedded into the mounting hole, the wire guide is also configured at a suitable position in the wire guide housing.

PRIOR ART DOCUMENT

Patent Document

Patent document 1: Japanese patent publication No. 2006-224259 Gazette

Sometimes, due to a contact between the running wire electrode and the conductor, metal powder is generated from the wire electrode and accumulated on the wire guide. The metal powder sandwiched between the wire electrode and the guide hole sometimes may cause unexpected disconnection of the wire electrode. In addition, the metal powder may possibly reduce the positioning accuracy of the wire electrode. Being fixed on the wire guide, the metal powder is hard to be removed. Sometimes, the metal powder may also be generated from the wire electrode due to the contact between parts, other than the conductor, and the wire electrode.

SUMMARY OF THE INVENTION

In view of the above, the disclosure is directed to a wire guide housing for a wire electrical discharge machining device, in which metal powder is not accumulated on a wire guide and the wire guide can be cleaned.

The disclosure provides a wire guide housing (1), for receiving a wire guide (6) for supporting a running wire electrode (W), and a wire running passage (32, 23b, 41, 26, 63, 66a) through which the wire electrode passes is formed in the wire guide housing (1). The wire guide housing includes: a cleaning liquid supply opening (43), for introducing a cleaning liquid (C) into the wire guide housing; a cleaning liquid discharge opening (44), for discharging the cleaning liquid out of the wire guide housing; a first flow passage (46), for connecting the cleaning liquid supply opening to the wire running passage; and a second flow passage (48), for connecting the wire running passage to the cleaning liquid discharge opening; and the cleaning liquid, at a side more upstream than the wire guide, flows into the wire running passage.

Preferably, the cleaning liquid flows out of the wire running passage at the side more upstream than the wire guide. Further, the wire guide housing preferably receives a conductor that is in contact with the wire electrode, and the cleaning liquid flows into the wire running passage between the conductor and the wire guide.

Effects

According to the wire guide housing of the disclosure, the cleaning liquid flow passage intersects with the wire running passage at the side more upstream than the wire guide. Therefore, the metal powder generated in the wire running passage is not accumulated on the wire guide and discharged out of the wire running passage.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
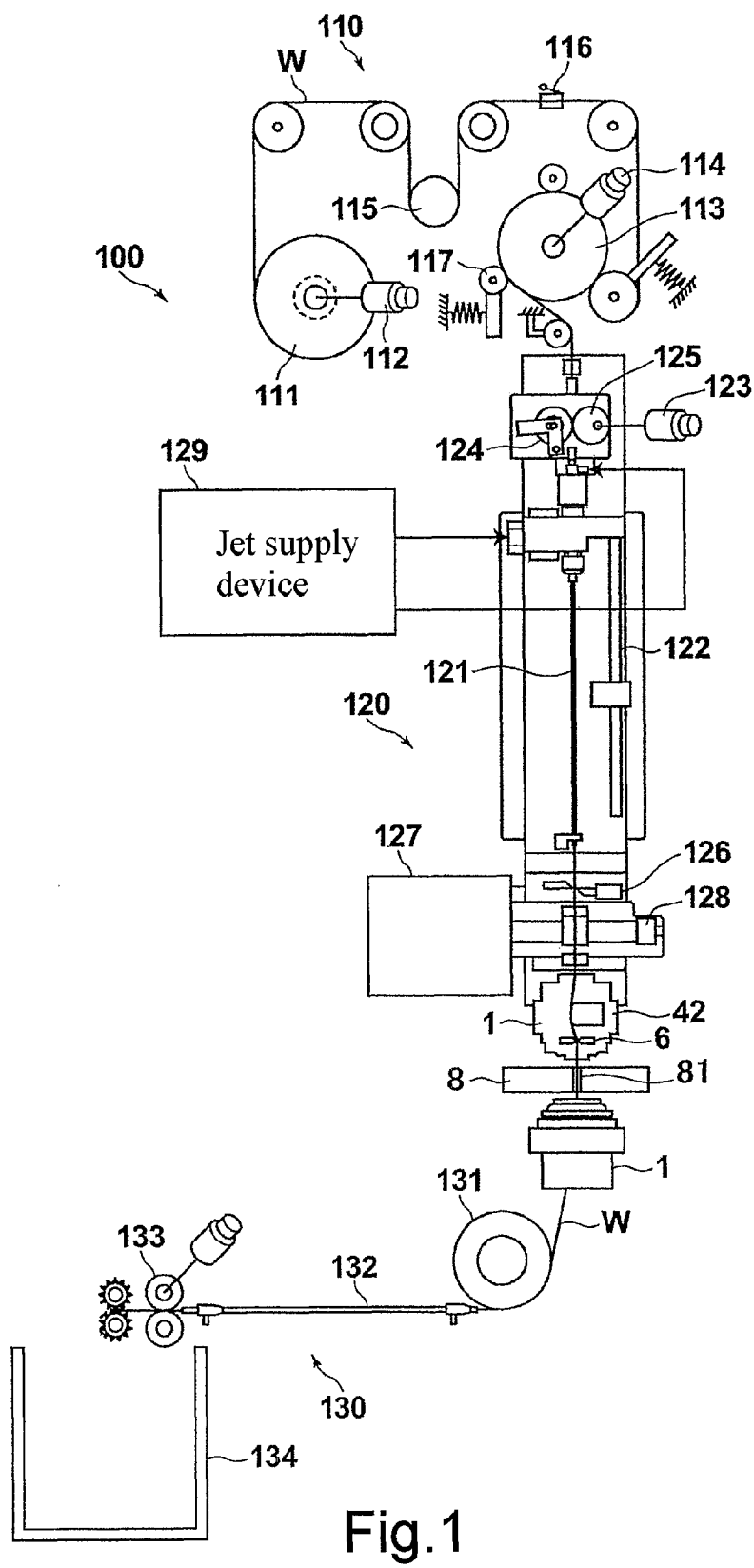
FIG. 1 is a side view illustrating a wire electrical discharge machining device including a wire guide housing according to the disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a wire electrical discharge machining device including a wire guide housing according to the disclosure. A wire electrical discharge machining device 100 includes: a wire supply section 110 for supplying a wire electrode W; a wire threading section 120 for threading the wire electrode W into a wire guide; a pair of wire guide housings 1; and a wire collection section 130 for collecting the used wire electrode W.

The pair of wire guide housings 1 vertically face each other across a work 8. Each of the wire guide housings 1 receives a wire guide for supporting the wire electrode W, and a conductor for transporting current to the wire electrode W. During machining, the wire electrode W runs between a pair of wire guides in a substantially vertical direction. The wire electrode W is made of brass, tungsten, and so on. The work 8 is fixed on a table (not shown) capable of moving horizontally. A starting hole 82 through which the wire electrode W can pass is formed in the work 8.

A wire supply section 110 includes a wire bobbin 111, a brake motor 112, a driving roller 113, a servo motor 114, a servo pulley 115, a limit switch 116, and a pinch roller 117. The brake motor 112 is connected to the wire bobbin 111 to apply tension to the wire electrode W in a returning direction. The servo motor 114 can rotate in both forward and reverse directions, and is connected to the driving roller 113. The pinch roller 117 moves with the driving roller 113 and presses the wire electrode W onto the driving roller 113. The servo pulley 115 and the limit switch 116 are disposed between the wire bobbin 111 and the driving roller 113. The servo pulley 115 prevents the tension of the wire electrode W from changing, and the limit switch 116 detects disconnection of the wire electrode W.

A wire threading section 120 includes a linear guide pipe 121, a lifting gear 122, a motor 123, a driven roller 124, a driving roller 125, a cut-off device 126, a scrap box 127, a clamper 128, and a jet supply device 129. The guide pipe 121 through which the wire electrode W can pass has an inner diameter of 1 mm and an outer diameter of 2 mm, and is configured vertically. The lifting gear 122 is configured to make the guide pipe 121 fall from a retracting position to the vicinity of the starting hole 82. The motor 123 is connected to the driving roller 125. The driven roller 124 and the driving roller 125 are disposed opposite to each other, and are disposed on a side more upstream than the guide pipe 121. The wire electrode W is sent out through the driving roller 125 and the driven roller 124, until the front end of the wire electrode W reaches a take-up roller 133. The cut-off device 126 is disposed at a downstream side of the guide pipe 121 to cut off the front end of the wire electrode W. The clamper 128 is disposed near the cut-off device 126 to clamp cut-off pieces of the wire electrode W and discard the cut-off pieces into the scrap box 127. The jet supply device 129 supplies high-pressure machining fluid into the guide pipe 121 to push the wire electrode W downwards.

A wire collection section 130 includes an idling roller 131, a carrying device 132, a take-up roller 133, and a bucket 134. The idling roller 131 is disposed close to the downstream of the lower wire guide housing 1 to change a moving direction of the wire electrode W from vertical into horizontal. The carrying device 132 is disposed downstream of the idling roller 131, and includes a guide pipe through which the wire electrode W passes. The guide pipe is configured horizontally, and fluid pushes the wire electrode W located in the guide pipe. The take-up roller 133 is disposed downstream of the carrying device 132. The wire electrode W sent from the take-up roller 133 is cut into thin pieces by a suitable cutter, and the thin pieces are recycled into the bucket 134.

Figure 6:
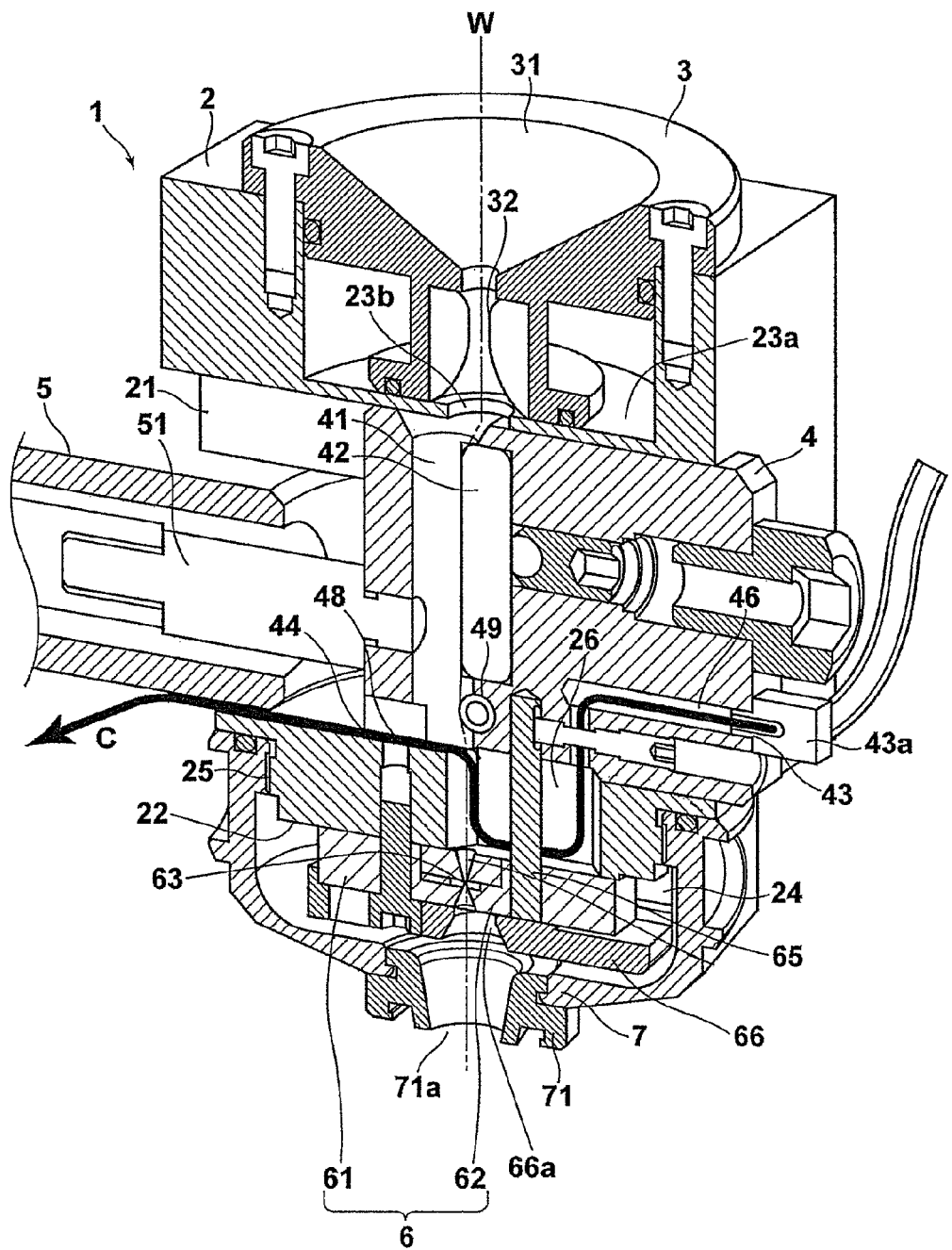
FIG. 6 is a three-dimensional sectional view illustrating the wire guide housing in FIG. 2.
Figure 7:
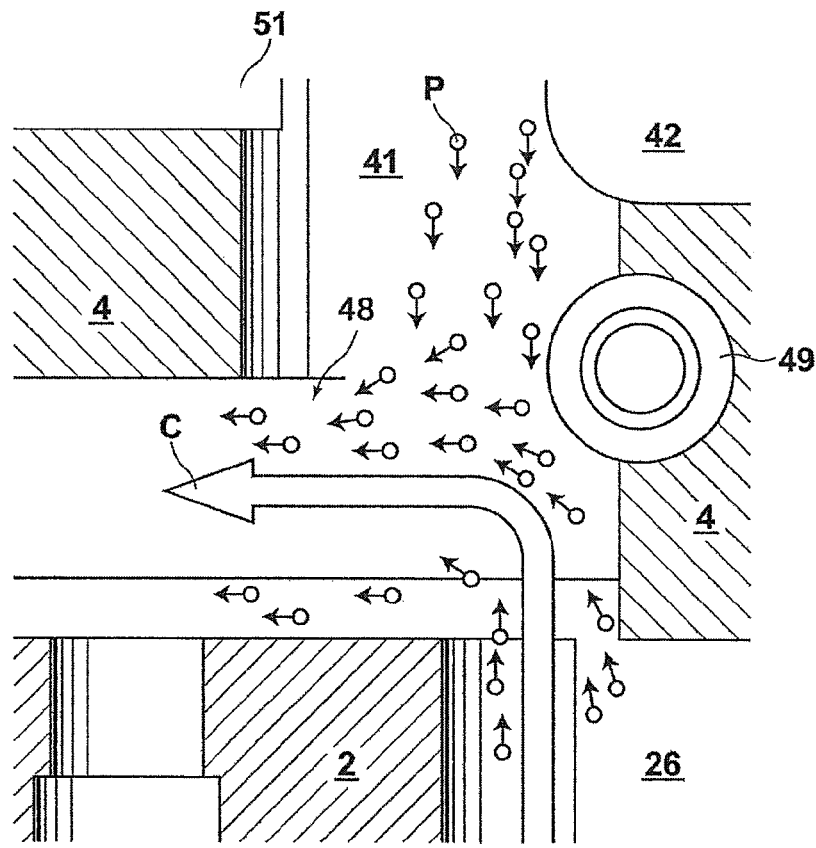
FIG. 7 is a sectional view illustrating a part of the wire guide housing in FIG. 2 after expansion.

Next, the implementation of the wire guide housing according to the disclosure is described with reference to FIGS. 2, 3, 4A, 4B, 5, 6, and 7. The following description is about the upper wire guide housing 1 disposed above the work 8, and the description about the lower wire guide housing 1 is omitted. FIG. 4A illustrates the upper wire guide housing 1 after the nozzle base is removed. FIG. 4B illustrates the upper wire guide housing 1 after the nozzle base and the wire guide are removed. Arrows in FIGS. 3, 6, and 7 schematically illustrate flowing of the cleaning liquid.

Figure 2:
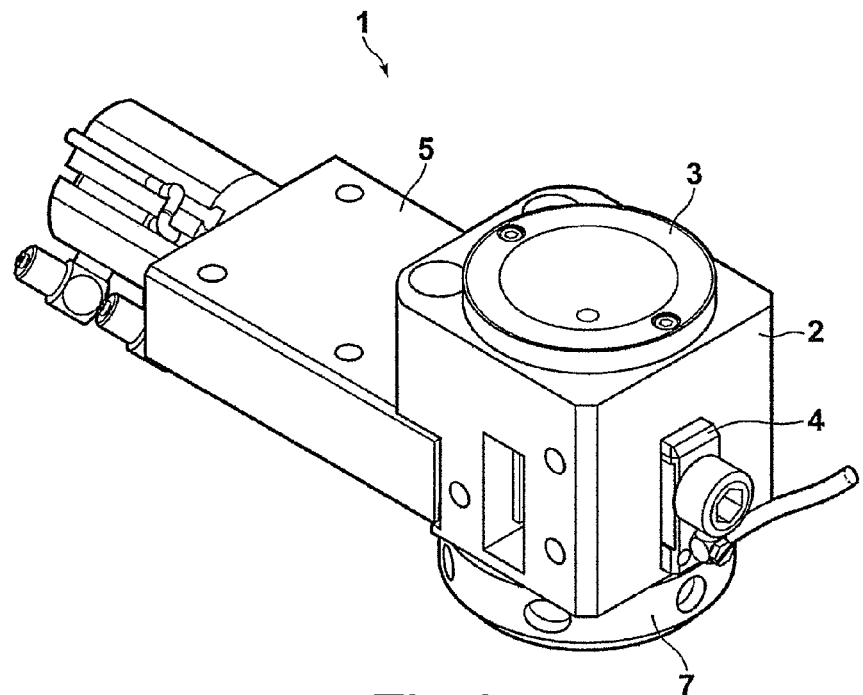
FIG. 2 is a three-dimensional view illustrating an upper wire guide housing in FIG. 1.
Figure 3:
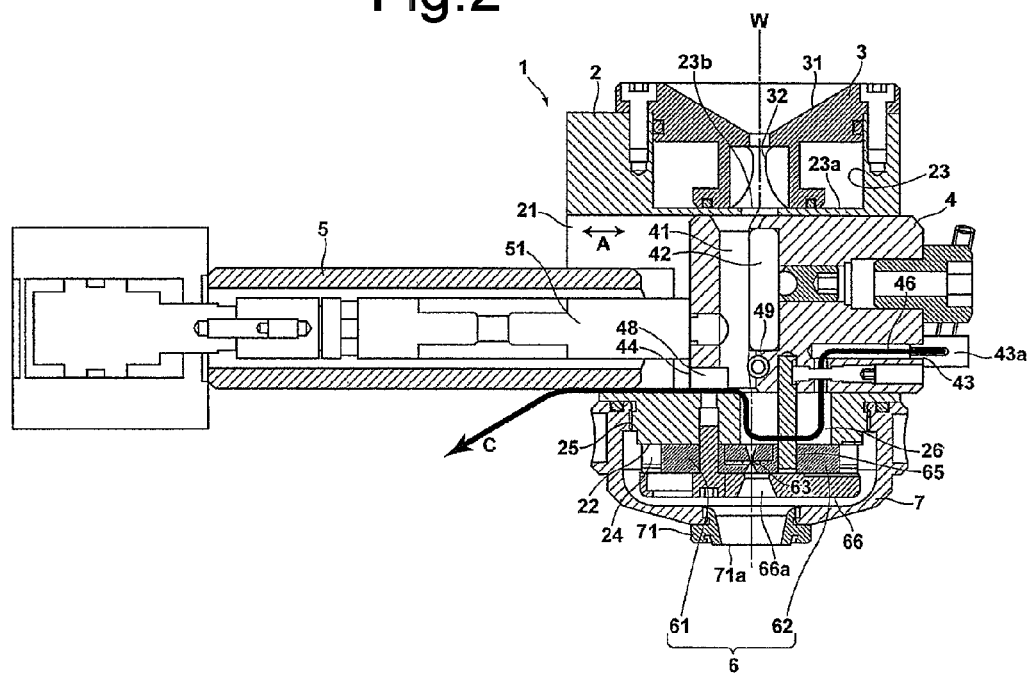
FIG. 3 is a sectional view illustrating the wire guide housing in FIG. 2.
Figure 4A:
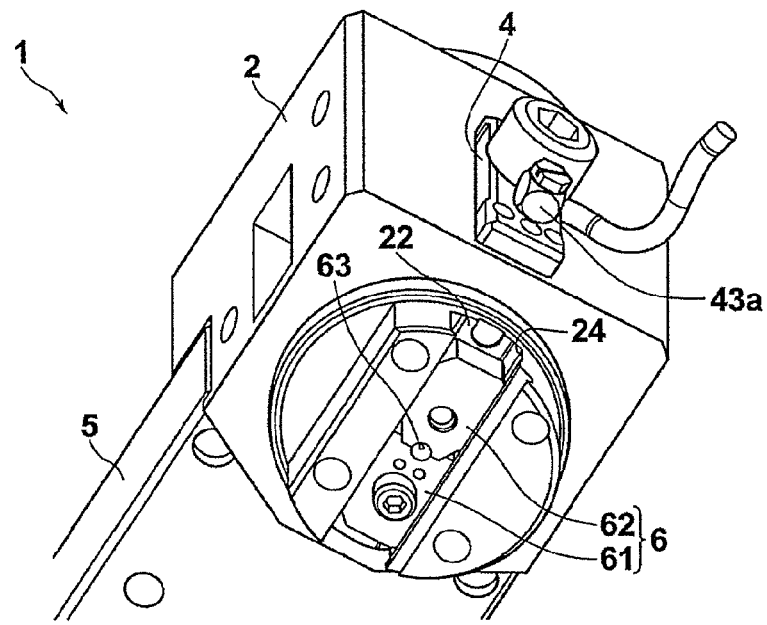
FIG. 4A is a three-dimensional view illustrating the wire guide housing in FIG. 2 observed from a bottom side.
Figure 4B:
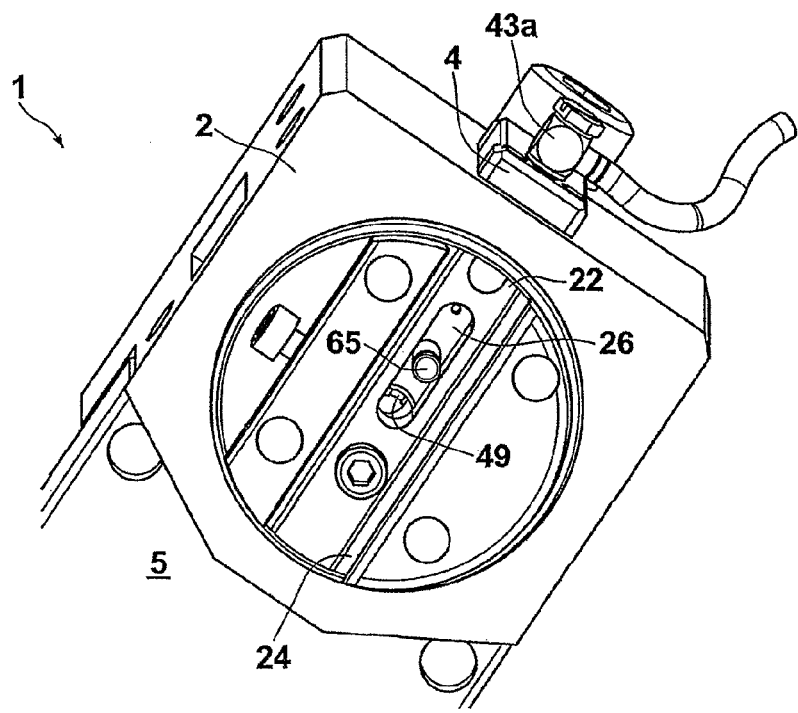
FIG. 4B is a three-dimensional view illustrating the wire guide housing in FIG. 2 observed from a bottom side.
Figure 5:
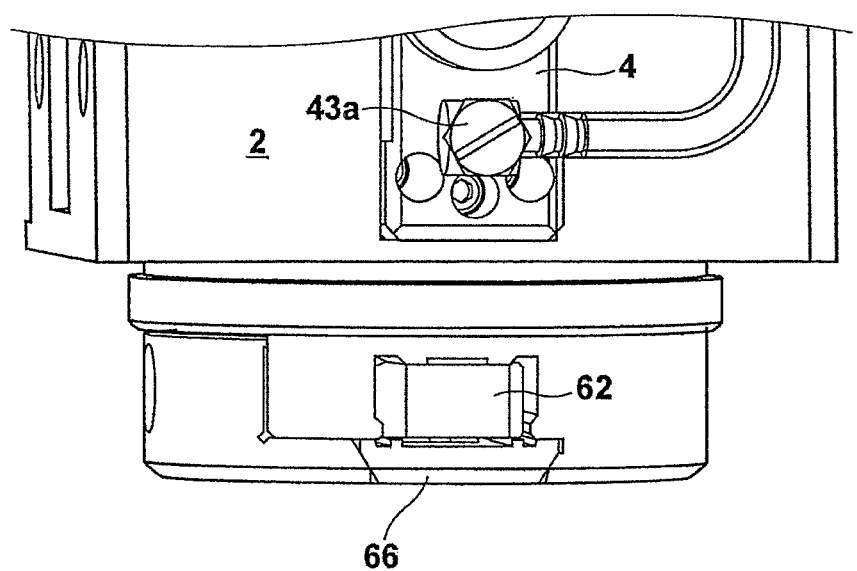
FIG. 5 is a side view illustrating a part of the wire guide housing in FIG. 2 observed from a right side.

As well illustrated in FIGS. 2 and 3, the wire guide housing 1 mainly includes a guide base 2, an insert block 3, a slide block 4, an actuator 5, a wire guide 6, and a nozzle base 7. The guide base 2 forms the body of the wire guide housing 1. The upper portion and the central portion of the guide base 2 are rectangular, and the lower portion thereof is cylindrical. As shown in FIG. 3, an insert hole 21 runs through the central portion of the guide base 2 horizontally. The slide block 4 is inserted into the insert hole 21. The actuator 5 enabling the slide block 4 to slide in the insert hole 21 is fixed on the guide base 2.

A mounting hole 23 extending vertically is formed on the upper portion of the guide base 2. The insert block 3 is inserted into the mounting hole 23 through an O ring, and is fixed on the guide base 2 with a screw. A base hole 23b connecting the mounting hole 23 to the insert hole 21 is formed on the bottom face 23a of the mounting hole 23. As shown in FIGS. 3, 4A, and 4B, a groove 24 is formed on the bottom face 22 of the guide base 2. The wire guide 6 is retained in the groove 24. As shown in FIG. 3, a screw 25 is formed on an external surface at the lower portion of the guide base 2. The nozzle base 7 is mounted at the lower portion of the guide base 2 with the screw 25. As shown in FIGS. 3 and 4B, a first passage 26 in communication with the insert hole 21 is formed on the bottom face 22 of the guide base 2. The first passage 26 has a width of about 4 mm.

A mortar-shaped opening 31 for carrying the wire electrode W is formed on the insert block 3. An insert guide 32 for guiding the wire electrode W into the base hole 23b is formed directly below the opening 31. The opening 31, the insert guide 32, the base hole 23b, and the first passage 26 are configured on a vertical straight line. The minimum inner diameter of the insert guide 32 is larger than the outer diameter of the guide pipe 121. Therefore, the guide pipe 121 can fall to the base hole 23b through the opening 31 and the insert guide 32.

A second passage 41, a cleaning liquid supply opening 43, a cleaning liquid discharge opening 44, a first flow passage 46, and a second flow passage 48 are formed on the slide block 4. The second passage 41 runs through the slide block 4 in a vertical direction. If the base hole 23b, the second passage 41, and the first passage 26 are arranged on a vertical straight line, the wire electrode W can pass through the guide base 2 and the slide block 4. A supply port 43a connected to a cleaning liquid source is mounted on the cleaning liquid supply opening 43. The cleaning liquid C flows from the cleaning liquid supply opening 43 through the first flow passage 46, the first passage 26, the second passage 41, and the second flow passage 48, and discharged out of the cleaning liquid discharge opening 44. The first flow passage 46 is configured for connecting the cleaning liquid supply opening 43 to a wire running passage, that is, to the first passage 26. The second flow passage 48 is configured for communication between a wire running passage, that is, the second passage 41 and the cleaning liquid discharge opening 44.

Additionally, the slide block 4 receives a conductor 42 along the second passage 41. The conductor 42 contacts the running wire electrode W and transports current to the wire electrode W. The conductor 42 is made of cemented carbide. Further, a pin guide 49 that moves with the running wire electrode W is configured along the second passage 41.

The actuator 5 includes a rod 51, and the front end of the rod 51 is screwed on the slide block 4. By driving the actuator 5, the slide block 4 can slide in the insert hole 21 in the direction of an arrow A.

Figure 8A:
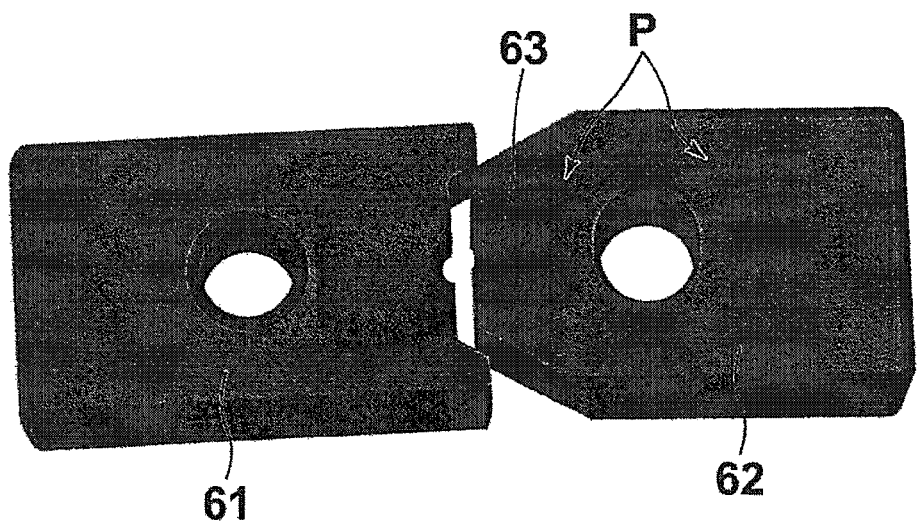
FIG. 8A is a picture of a wire guide used in a wire guide housing in the prior art.
Figure 8B:
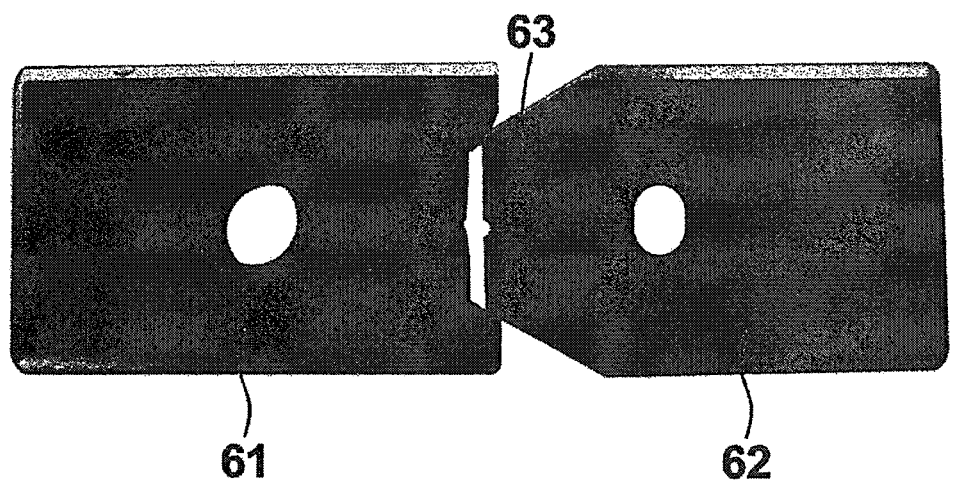
FIG. 8B is a picture of a wire guide used in the wire guide housing in FIG. 2.

The wire guide 6 includes a fixed guide 61 and a movable guide 62. As shown in FIGS. 8A and 8B, the fixed guide 61 and the movable guide 62 are rectangular. If the fixed guide 61 and the movable guide 62 are joined, a guide hole 63 is formed. The guide hole 63 has a minimum inner diameter which is 0.01 mm larger than the diameter of the wire electrode W. The guide hole 63 forms a funnel-shaped opening on the upper surface and the lower surface of the wire guide 6. Additionally, a joint surface of the fixed guide 61 and the movable guide 62 includes a central axis of the guide hole 63. Thus, the running wire electrode W is positioned relative to the wire guide housing 1 by providing the wire electrode W to pass through the guide hole 63.

The fixed guide 61 is fixed on the bottom face 22 with the screw. A pin 65 runs through the movable guide 62. An end of the pin 65 is fixed on the slide block 4. A guide cover 66 for preventing a falling of the movable guide 62 can be mounted on the other end of the pin 65. The guide cover 66 includes a cover hole 66a allowing the wire electrode W to pass. In addition, the wire guide 6 is not limited to be formed of two parts, and may also be formed by one part.

The nozzle base 7 includes a nozzle 71 for jetting machining fluid to the work 8. The nozzle 71 includes a nozzle opening 71a allowing the wire electrode W to pass. In this way, the insert guide 32, the base hole 23b, the second passage 41, the first passage 26, the guide hole 63, the cover hole 66a, and the nozzle opening 71a form a wire running passage in the wire guide housing 1.

Secondly, the action of the wire guide housing 1 is described with reference to FIG. 3. The slide block 4 in FIG. 3 is located at an action position where the conductor 43 is pressed against the wire electrode W. Before the action of threading the wire electrode W into the wire guide 6, the slide block 4 moves towards a retracting position on the right side in FIG. 3. At this time, the movable guide 62 also slides in the right direction in the groove 24. When the slide block 4 is located at the retracting position, the second passage 41 is aligned with the base hole 23b on a vertical straight line. Therefore, the guide pipe 121 can fall to the vicinity of the upper surface of the work 8 through the guide base 2, the insert block 3, the slide block 4, the wire guide 6, and the nozzle 71. After the wire electrode W passes through the wire guide 6, the guide pipe 121 returns to the upper retracting position, and the slide block 4 returns to the action position.

Next, the implementation of cleaning the wire guide housing according to the disclosure is described. The symbol reference P in FIG. 7 indicates the metal powder generated in the second passage 41 due to friction between the wire electrode W and the conductor 42. The metal powder P falls down towards the wire guide 6 through the first passage 26. Additionally, the cleaning liquid C uses the same liquid as the machining fluid.

The cleaning liquid C is guided into the first passage 26 through the first flow passage 46. Since the diameter of the guide hole 63 is smaller, the cleaning liquid C may flow into the second passage 41 when the first passage 26 is filled with the cleaning liquid C. Therefore, the water level of the cleaning liquid C in the second passage 41 rises, and the cleaning liquid C flows through the second flow passage 48 and is discharged out of the wire guide housing 1 from the cleaning liquid discharge opening 44.

Therefore, the metal powder P in the first passage 26 and the second passage 41 is no longer accumulated on the wire guide 6 due to the flowing of the cleaning liquid C, and is discharged out of the wire guide housing 1.

The cleaning liquid C only needs to be guided into a wire running passage at an upstream side of the wire guide 6. Additionally, the cleaning liquid C only needs to be exported from the wire running passage at the upstream side of the wire guide 6.

The cleaning liquid C flows into the wire running passage at the upstream of the wire guide 6, and flows out of the wire running passage at the upstream of the wire guide 6. As a result, the metal powder P is no longer accumulated on the wire guide 6 and washed away effectively.

As shown in FIGS. 8A and 8B, if the cleaning liquid C is guided into the wire running passage located in the wire guide housing 1, the metal powder P is no longer accumulated on the wire guide 6.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wire guide housing, for receiving a wire guide for supporting a running wire electrode running substantially in a vertical direction and a conductor that is in contact with the running wire electrode, and formed with a wire running passage through which the running wire electrode passes, comprising:
   a cleaning liquid supply opening, for guiding a cleaning liquid into the wire guide housing;
   a cleaning liquid discharge opening, for discharging the cleaning liquid out of the wire guide housing;
   a first flow passage, for connecting the cleaning liquid supply opening to the wire running passage; and
   a second flow passage, for connecting horizontally the wire running passage to the cleaning liquid discharge opening, wherein
   the cleaning liquid flows into the wire running passage only at a side more upstream than the wire guide, and the cleaning liquid flows out of the wire running passage between the conductor and the wire guide.

2. The wire guide housing according to claim 1, wherein the cleaning liquid flows out of the wire running passage at the side more upstream than the wire guide.

3. The wire guide housing according to claim 1, wherein the cleaning liquid flows into the wire running passage between the conductor and the wire guide.

* * * * *